May 21, 1940.  F. E. MIZERA  2,201,911

NUT SHELLER

Filed Dec. 29, 1938

Inventor
Frank E. Mizera
By [signature]
Attorney

Patented May 21, 1940

2,201,911

UNITED STATES PATENT OFFICE 2,201,911

NUT SHELLER

Frank E. Mizera, Waco, Tex., assignor of one-half to Marguerite Kubitza, Waco, Tex.

Application December 29, 1938, Serial No. 248,318

3 Claims. (Cl. 146—13)

This invention relates to an improved nut sheller particularly adapted for use in peeling the shells from cracked pecan nuts.

More particularly, it is an aim of this invention to provide a tool adapted for use in peeling the shells from cracked nuts and for cleaning shell particules from the grooves and recesses in the nut kernels or meats.

More particularly, it is an aim of this invention to provide a tool of simple durable construction capable of being economically manufactured and adapted for use either commercially in preparing shelled nut meats or domestically in shelling or cleaning nut kernels.

Other objects and advantages of the invention will hereinafter become more fully apparent from the following description of the drawing, which illustrates a preferred embodiment thereof, and wherein—

Figure 1:
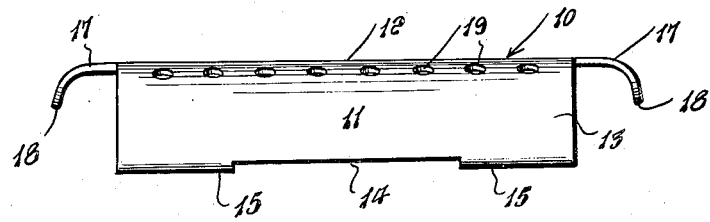
Figure 1 is a side elevational view of the tool.

Referring more particularly to the drawing, wherein like reference characters designate like or corresponding parts throughout the different views, 10 designates generally the tool or device which comprises the body portion 11 preferably formed from a strip of sheet metal which is bent longitudinally in to a substantially inverted U-shaped form to provide a rounded or convex intermediate portion 12 terminating in the converging sides 13.

Figure 3:
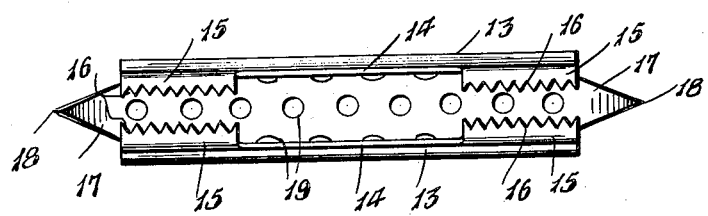
Figure 3 is a bottom plan view of the same.
Figure 4:
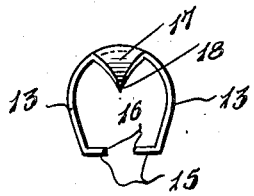
Figure 4 is an end view in elevation of the same.
Figure 5:
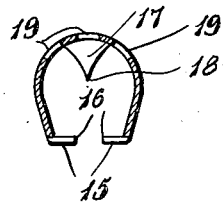
Figure 5 is a transverse sectional view taken along the line 5—5 of Figure 2.

The longitudinal edges of the handle portion 11, designated 14, are disposed in substantially parallel spaced apart relationship, as best seen in Figure 3. Formed integral with the edges 14 and adjacent the ends thereof are the flanges 15 which are bent to project inwardly so that the flanges at corresponding ends of the edges 14 are arranged in opposed relationship with their adjacent free edges spaced a substantial distance apart. Said free edges, as best seen in Figure 3, are notched to provide the teeth 16 which extend the length thereof.

The intermediate portion 12 is elognated at its ends and intermediate the longitudinal edges 14 to provide the prongs 17 which are tapered to form the pointed free ends 18. Prongs 17 are bent intermediate of their ends so that their pointed ends 18 are curved downwardly, as best seen in Figure 1.

Figure 2:
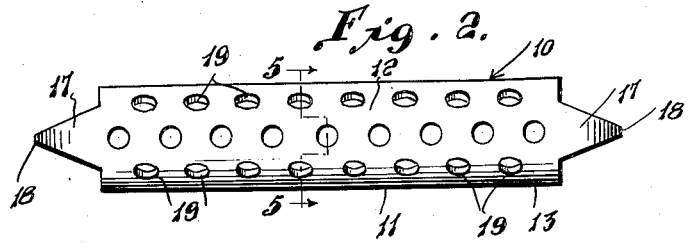
Figure 2 is a top plan view of the same.

The intermediate portion 12 of the handle 11 is preferably provided with a plurality of openings or apertures 19 which, as illustrated in Figure 2, may be arranged in longitudinal staggered rows.

Tool 10, as heretofore mentioned is adapted for peeling the shells from nuts and for cleaning the kernels or meats thereof and is especially adapted for use with pecan nuts. The handle portion 11 is intended to be grasped in the palm of one hand with the intermediate portion 12 resting against the palm and with the fingers engaging one of the sides 13 and the thumb engaging the other side 13 adjacent to one of the flanges 15. The nuts to be peeled and cleaned are first cracked, after which they are individually grasped in the other hand and the toothed edge 16 of the flange 15, adjacent to which the thumb is positioned, is then employed to engage under the cracked edges of the shell and to pry the shell outwardly to peel it from the kernel or meat contained therein. The kernels of many nuts, especially pecan nuts have relatively deep grooves so that when the shells are cracked and peeled small particles thereof frequently lodge in these grooves and the prongs 17 are provided to function as picks for removing these particles. Also, particularly in pecan nuts the kernels grow in two distinct sections connected at one end with the adjacent sides of said sections held apart by a partition, having a very bitter taste, which must be removed before the kernels are ready to be eaten. The prongs or picks 17 may be also used for scooping out this partition and scraping any particles thereof out of the recesses in the kernel sections.

While the tool 10 has been described particularly as being useful for shelling and cleaning pecan nuts it is equally well adapted for shelling various other types of nuts and may be held and used in the same manner or in any other manner found convenient or desirable.

Various modifications and changes in the precise construction and arrangement of the parts forming the invention are contemplated and may obviously be resorted to, and the right is therefore expressly reserved to make such variations and changes as fall within the spirit and scope of the invention as hereinafter defined by the appended claims.

I claim as my invention:

1. A nut sheller comprising a body portion bent longitudinally to provide a rounded intermediate portion, the longitudinal edges of said body portion being disposed in spaced apart relationship, flanges formed integral with said edges, adjacent their ends, and bent to project inwardly, the free edges of said flanges being serrated and spaced from the free edge of the adjacent flange, tapered prongs provided with downturned free ends formed integral with the ends of said body portion and intermediate the longitudinal edges thereof.

2. A pecan sheller comprising a handle portion formed from a sheet of material bent longitudinally to provide a convex intermediate portion, the longitudinal edges of said sheet being disposed in spaced apart relationship, flanges formed integral with said edges and bent to extend inwardly and in opposed relationship to each other, the free edges of said flanges being arranged in spaced relationship, and said free edges being provided with teeth.

3. A nut sheller and cleaner comprising a handle portion formed from a sheet of material bent longitudinally with its longitudinal edges disposed in spaced apart relationship, corresponding flanges formed integral with corresponding portions of said edges and bent to project inwardly therefrom, the free edges of said flanges being toothed and disposed in spaced apart relationship, and a prong formed integral with the end of said handle portion, intermediate of its longitudinal edges, said prong tapering to a point at its free end and being bent downwardly adjacent said pointed end.

FRANK E. MIZERA.